(12) United States Patent
Morimoto et al.

(10) Patent No.: US 6,507,549 B2
(45) Date of Patent: Jan. 14, 2003

(54) DEVICE FOR READING FROM AND/OR WRITING TO OPTICAL RECORDING MEDIA

(75) Inventors: Yasuaki Morimoto, Chiba (JP); Friedhelm Zucker, Villingen-Schwenningen (DE); Christian Büchler, Villingen-Schwenningen (DE)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/734,623

(22) Filed: Dec. 12, 2000

(65) Prior Publication Data

US 2001/0006504 A1 Jul. 5, 2001

(30) Foreign Application Priority Data

Dec. 13, 1999 (DE) .......................... 199 60 056

(51) Int. Cl.⁷ ................................ G11B 7/00
(52) U.S. Cl. ..................... 369/112.21; 369/112.09; 369/44.11
(58) Field of Search .................... 369/44.11, 44.12, 369/44.14, 44.23, 112.01, 112.03, 112.05, 112.09, 112.14, 112.21, 112.29

(56) References Cited

U.S. PATENT DOCUMENTS

| | | | |
|---|---|---|---|
| 5,063,556 A | 11/1991 | Chikuma | 369/112 |
| 5,189,651 A | 2/1993 | Utsumi | 369/13 |
| 5,687,146 A | 11/1997 | Murano et al. | 369/44.23 |
| 5,745,304 A * | 4/1998 | Choi | 369/44.12 X |

\* cited by examiner

Primary Examiner—Muhammad Edun
(74) Attorney, Agent, or Firm—Joseph S. Tripoli; Joseph J. Laks; Robert D. Shedd

(57) ABSTRACT

A device for reading from and/or writing to optical recording media, the device comprising a light source for producing a scanning beam, a photodetector for detecting the scanning beam reflected by the recording medium and a semi-transparent mirror arranged in the beam path for directing the scanning beam onto the recording medium and the reflected scanning beam onto the photodetector. An object of the invention is to improve a device of this type, in particular with regard to reducing the production costs. This object is achieved by the semi-transparent mirror being a plane-parallel plate with a layered structure, and a partially reflective layer being arranged between two small carrier plates.

10 Claims, 1 Drawing Sheet

DEVICE FOR READING FROM AND/OR WRITING TO OPTICAL RECORDING MEDIA

FIELD OF THE INVENTION

The present invention relates to a device for reading from and/or writing to optical recording media, which has a light source for producing a scanning beam, a photodetector for detecting the scanning beam reflected by the recording medium and a semi-transparent mirror for directing the scanning beam onto the recording medium and the reflected scanning beam onto the photodetector.

BACKGROUND OF THE INVENTION

A device of this type is known from EP-A-0 198655. To be regarded as a disadvantage of the known device is that, in the case of the semi-transparent mirror, a reflective layer is arranged on the surface of a carrier element. There is therefore the risk of the reflective layer being adversely affected by external influences. Therefore, rejects must be expected during production, or increased expenditure for the prevention of rejects must be expected.

SUMMARY OF THE INVENTION

An object of the invention is to improve a device of this type for reading from or writing to optical recording media, in particular also with regard to reducing the production costs.

According to the invention, it is provided for this purpose that the semi-transparent mirror is a plane-parallel plate with a layered structure, a partially reflective layer being arranged between two small carrier plates. This has the advantage that the reflective layer is protected by the carrier plates against external influences of a mechanical, chemical or other nature, both before and during the production of the device as well as during its operation.

According to the invention, it is also envisaged to arrange a grating structure between the carrier plates. This has the advantage that a grating structure which is required in any case in the device, for example for producing primary and secondary scanning beams, or influencing the beam in some other way, for example by a hologram grating structure, is integrated into the semi-transparent mirror. The grating structure is consequently also protected against external influences. This dispenses with a component which otherwise has to be separately made and installed, and dispenses with the corresponding effort for its adjustment. The grating structure is in this case preferably applied to one of the carrier plates, or is formed into it, and is provided with the reflective layer. According to one variant, a complementary structure is provided directly on the other carrier plate. According to a further variant, a layer of adhesive is arranged on the reflective layer, which essentially has the grating structure of the carrier plate lying underneath it, and the said layer of adhesive fastens the other carrier plate on the first carrier plate. A further advantage of the grating structure arranged between the carrier plates is that it is effective only in reflection, since in this case phase differences occur between the waves reflected at the elevations and the waves reflected at the depressions of the grating structure. In transmission through both carrier plates, on the other hand, the grating structure has no, or virtually no, effect on the phase of the waves of the scanning beam. This applies if the refractive indices of the individual layers essentially coincide.

According to one embodiment of the invention, at least one of the carrier plates has a defined thickness. This has the advantage that a defined astigmatism is produced by this carrier plate of a defined thickness in the beam passing through it. The beam coming from the light source usually already has astigmatism, in particular if a laser diode, which has no means of compensating for astigmatism, is used as the light source. The thickness of the carrier plate of a defined thickness is adapted to the astigmatism of the beam emerging from the light source in such a way that the astigmatism produced by the carrier plate compensates as well as possible for the already existing astigmatism of the beam. Consequently, a scanning beam free from astigmatism falls on the recording medium. This leads to a reduction in possible scanning errors and to the avoidance of focusing errors, in particular whenever a focusing method using astigmatism is used for focusing the scanning beam onto an information-carrying layer of the recording medium.

It is provided according to the invention that the semi-transparent mirror is arranged at a defined angle with respect to the optical axis of the scanning beam coming from the light source. This has the advantage that no separate compensation for the astigmatism in the scanning beam produced by the light source is required. Both the thickness of the carrier plate and its angle in relation to the optical axis are optimally set according to the invention for astigmatism compensation. The angle is fixed in this case, at least for a certain type of light source, according to the magnitude of the astigmatism of the scanning beam produced by this light source. The angle preferably lies in the range of 30°, while an angle of 45° is usually provided. During the assembly of the device, adjustment of the light source in the direction of rotation about the optical axis is carried out, whereby the optimum alignment with respect to the mirror for astigmatism compensation is achieved.

According to the invention, it is provided that the light source of the device is an unpackaged laser diode. This has the advantage that it is a low-cost component. The disadvantages of a laser diode not packaged in a housing, in particular that of the uncompensated astigmatism, are overcome by the arrangement and design of the semi-transparent mirror according to the invention.

Further advantageous configurations of the invention are also specified in the following description of an exemplary embodiment. It goes without saying that here, too, developments not specified but within the ability of a person skilled in the art are likewise within the scope of the present invention.

DETAILED DESCRIPTION OF PREFERED EMBODIMENTS

Figure 1:
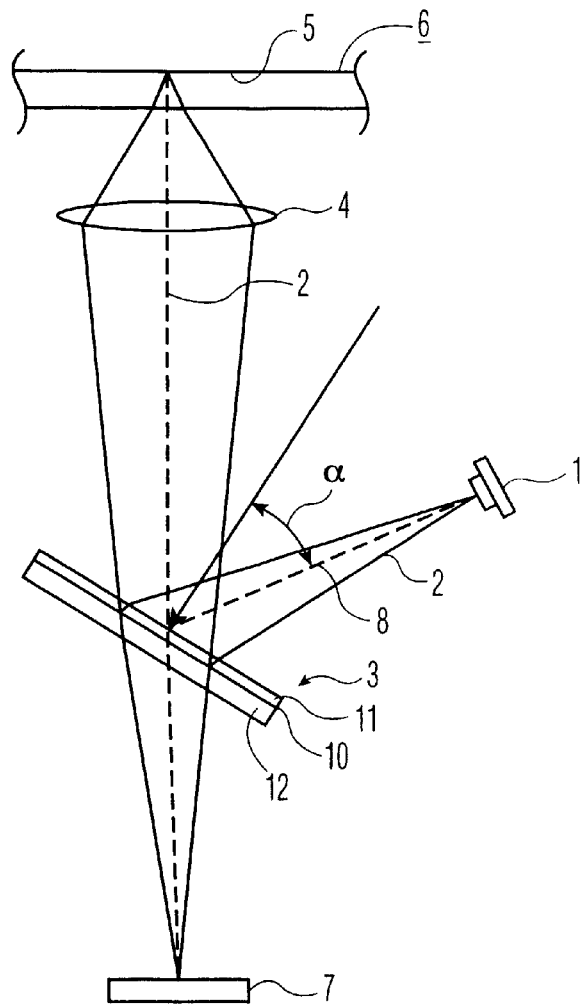
FIG. 1 shows a schematic representation of a device according to the invention.

FIG. 1 shows a device according to the invention in a schematic representation. A laser diode 1, which has no astigmatism-compensating element, produces a scanning beam 2 provided with astigmatism. This falls on a semi-transparent mirror 3, is reflected by the latter and focused by means of an objective lens 4 onto an information-carrying layer of an optical recording medium 6. The recording medium 6 is shown only partially and in a sectioned representation. The information-carrying layer 5 has date markings, which are preferably arranged along a spiral or circular track and influence at least one of the properties of the scanning beam 2 when the latter is reflected. In the simplest case, the intensity of the reflected beam is concerned here, that it is to say a difference between light and dark. Here, too, other beam-influencing possibilities familiar to a person skilled in the art can also be meaningfully used. The reflected scanning beam 2 returns through the objective lens 4, passes through the semi-transparent mirror 3 and falls onto a photodetector 7. The semi-transparent mirror 3 thus directs the scanning beam 2 on the one hand by reflection onto the recording medium 6 and on the other hand by transmission onto the photodetector 7.

The photodetector 7 generally comprises a plurality of detector elements, which convert the light signal respectively impinging on them into an electrical signal and passes this on for evaluation at evaluating means (not represented) of the device, which are known to a person skilled in the art. They serve firstly for the tracking and focusing of the scanning beam 2 onto the information-carrying layer 5, for controlling a drive of the optical recording medium 6 and, if appropriate, further control loops and for obtaining and preparing for output the data signal recorded on the recording medium 6.

It can be seen that the semi-transparent mirror 3 is arranged at an angle α with respect to the optical axis 8 of the scanning beam 2. The angle α is not, as usual, α=45°, but deviates from this. For the type of laser diode 1 chosen in the exemplary embodiment, it has been chosen for optimum adaptation as α=30°. The semi-transparent mirror comprises a first carrier plate 11 and a second carrier plate 12, between which a partially reflective layer 10 is arranged. The first carrier plate 11 acts in this case as an astigmatism-compensating component to compensate for the astigmatism present in the scanning beam 2 coming from the laser diode 1. Also arranged between the carrier plates 11, 12 is a grating structure, not visible here, which serves for producing primary and secondary scanning beams. These run essentially within the region represented of the scanning beam 2, so they are not separately represented here. They serve for example for carrying out the known three-beam tracking method or some other scanning method using three or more scanning beams.

Figure 2:
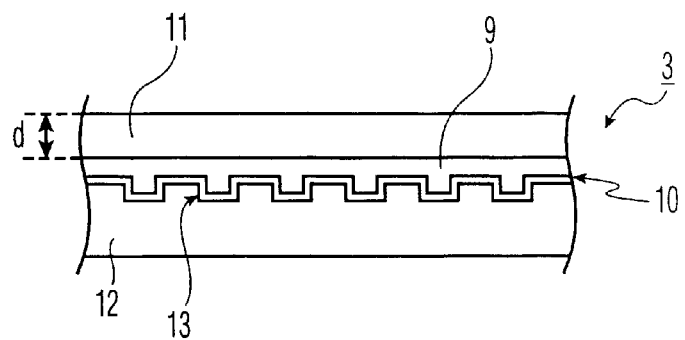
FIG. 2 shows a schematic sectional representation of the semi-transparent mirror of a device according to the invention.

FIG. 2 shows an enlarged schematic section, not to scale, through the semi-transparent mirror 3 of the device according to the invention. The first carrier plate 11 preferably consists of glass. It has a defined thickness d, which, like the angle α, is optimized to values favourable for the astigmatism compensation. The second carrier plate 12 is provided with a grating structure 13. This may be produced for example by etching, engraving or by photochemical means. It is likewise possible to produce the carrier plate 12 as a moulded part in a mould having the corresponding grating structure 13 in a complementary way. This and further variants are within the ability of a person skilled in the art. The reflective layer 10, which is for example a thin, vapour-deposited layer of aluminium, is applied to the grating structure 13. The carrier plates 11, 12 are bonded to each other by means of a bonding layer 9, which is for example a layer of adhesive.

The device according to the invention has a reduced number of optical components in comparison with conventional devices. The function of the astigmatism compensation, the diffraction grating and a beam splitter is performed according to the invention by the semi-transparent mirror 3. The carrier plates 11, 12 preferably consist of glass. An important property of the semi-transparent mirror 3 according to the invention is that it acts in reflection as a diffraction grating corresponding to the grating structure 13, but in transmission on the other hand it acts as a plane-parallel plate. This effect is achieved by a phase shift occurring between the beams reflected at the depressions of the grating structure 13 and the beams reflected at the elevations of the grating structure 13, i.e. only in reflection. The phase shift is determined by the depth of the depressions and the refractive index of the material used. If the refractive indices of the carrier plates 11, 12 and of the bonding layer 9 are chosen to be equal or virtually equal, the semi-transparent mirror 3 acts in transmission as a virtually homogeneous plane-parallel plate. In the arrangement described, astigmatism occurs in transmission through the first carrier plate 11. This compensates for the astigmatism which is contained in the beam produced by the laser diode 1. A compensation of this type is suitable in particular in the case of laser diodes of the so-called gain-guide type, the astigmatism of which is usually compensated by an exit window of a housing surrounding the laser diode. This usual compensation takes place for example by means of a glass plate which is 250 μm thick and inclined by 30° with respect to the beam path. To assume its function, the first carrier plate 11 is inclined by an angle α=30° with respect to the optical axis 8 and has half the corresponding thickness, that is to say d=125 μm. The scanning beam 2 passes through the first carrier plate 1 twice, once before and once after the reflection, so that effectively the same passed thickness is achieved.

Semiconductor lasers, like laser diodes, are usually provided with a glass plate which is tilted by approximately 30° with respect to the optical axis. This compensates for image errors of a low order, such as astigmatism for example. These image errors occur to a particularly great extent in the case of semiconductor lasers, because of the poor mirror-distance to beam-diameter ratio and the therefore great beam angle. Glass plates of this type have a thickness of the order of magnitude of 50 μm to 250 μm. However, these glass plates at the same time produce image errors of a higher order, such as comatic aberrations. According to the invention, the function of the astigmatism compensation is realized by the first carrier plate 11, which has only half the usually required thickness. This means that the negative effect of the comatic aberration is also reduced.

What is claimed is:

1. A device for reading from or writing to optical recording media, comprising:

a light source for producing a scanning beam, a photodetector for detecting the scanning beam reflected by a recording medium, and a semi-transparent mirror having two small carrier plates arranged in the beam path for directing the scanning beam onto the recording medium and the reflected scanning beam onto the photodetector, wherein the semi-transparent mirror is a plane-parallel plate with a layered structure, a partially reflective layer being arranged between the two small carrier plates, and wherein at least one of the carrier plates has a defined thickness.

2. Device according to claim 1, wherein the light source is an unpackaged laser diode.

3. Device according to claim 2, wherein the semi-transparent mirror is arranged at a defined angle with respect to the optical axis of the scanning beam coming from the light source.

4. Device according to claim 3 wherein the light source is an unpackaged laser diode.

5. A device for reading from or writing to optical recording media, comprising:

- a light source for producing a scanning beam,
- a photodetector for detecting the scanning beam reflected by a recording medium, and
- a semi-transparent mirror having two small carrier plates arranged in the beam path for directing the scanning beam onto the recording medium and the reflected scanning beam onto the photodetector, wherein
- the semi-transparent mirror is a plane-parallel plate with a layered structure, a partially reflective layer being arranged between the two small carrier plates, and
- wherein a grating structure is provided between the two small carrier plates.

6. Device according to claim 5, wherein at least one of the two small carrier plates has a defined thickness.

7. Device according to claim 6, wherein the light source is an unpackaged laser diode.

8. Device according to claim 7, wherein the semi-transparent mirror is arranged at a defined angle with respect to the optical axis of the scanning beam coming from the light source.

9. Device according to claim 8, wherein the light source is an unpackaged laser diode.

10. A device for reading from or writing to optical recording media, comprising:

- a light source for producing a scanning beam,
- a photodetector for detecting the scanning beam reflected by a recording medium, and
- a semi-transparent mirror having two small carrier plates arranged in the beam path for directing the scanning beam onto the recording medium and directing the reflected scanning beam onto the photodetector, wherein
- the semi-transparent mirror is a plane-parallel plate with a layered structure,
- a partially reflective layer being arranged between said two small carrier plates,
- a first of said small carrier plates acting as an astigmatism-compensating component to compensate for the astigmatism in the scanning beam coming from the laser diode.

* * * * *